April 12, 1927.
B. SIMPSON
1,624,768
TAILOR'S MEASURE
Filed Aug. 5, 1924
2 Sheets-Sheet 1
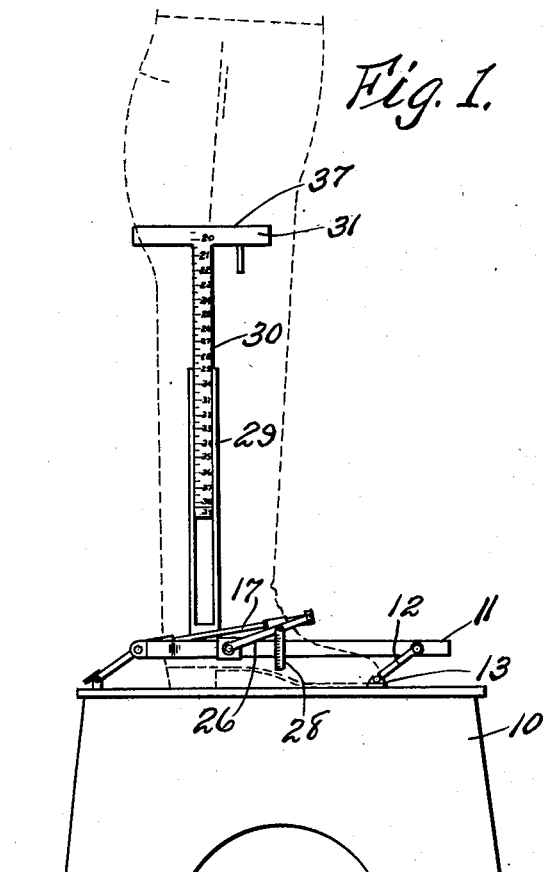
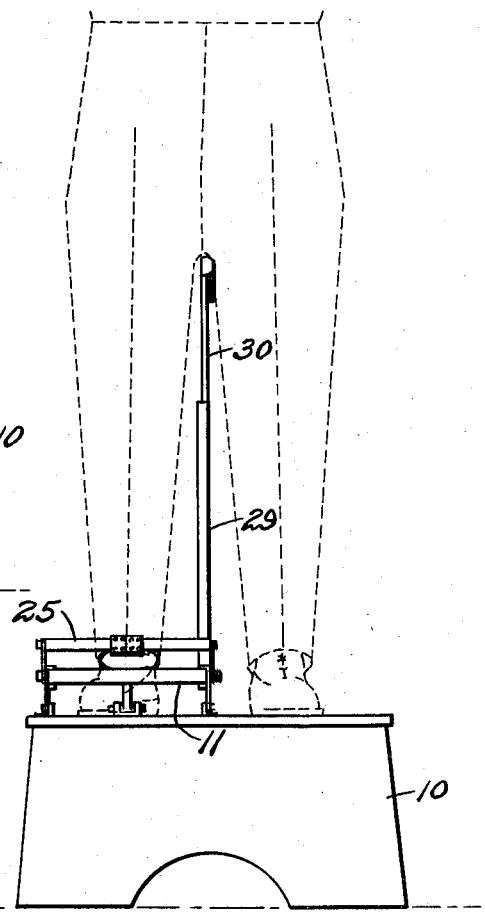
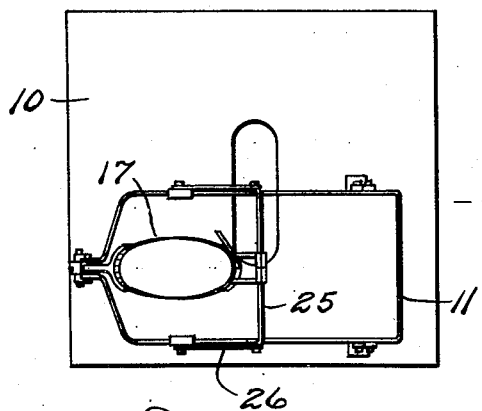
Bryant Simpson
INVENTOR
BY Victor J. Evans
ATTORNEY
WITNESS:

April 12, 1927.
B. SIMPSON
TAILOR'S MEASURE
Filed Aug. 5, 1924
1,624,768
2 Sheets-Sheet 2
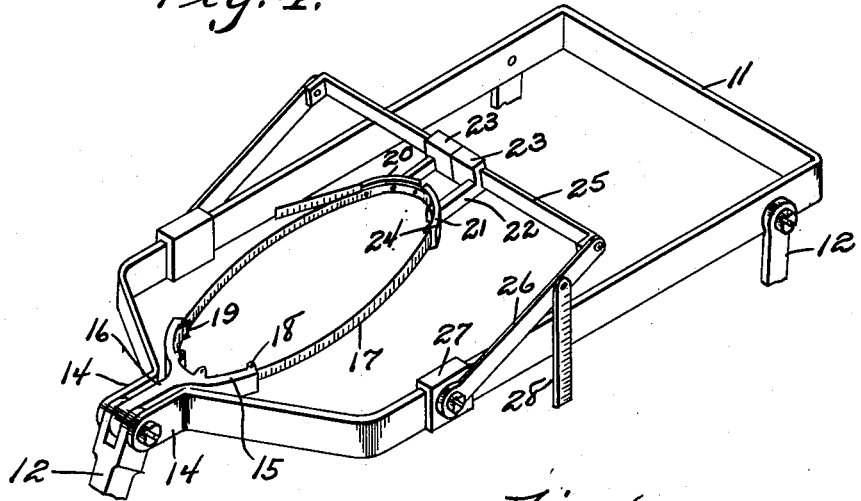
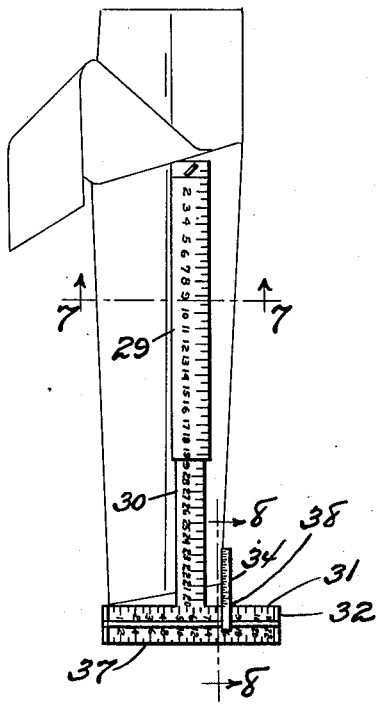
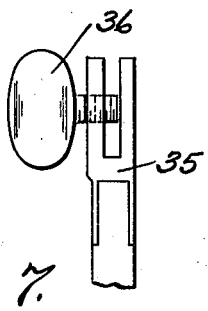
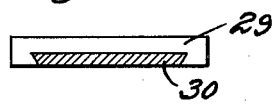
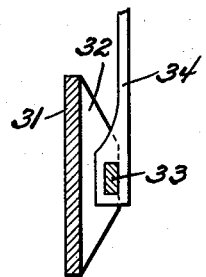
Bryant Simpson
INVENTOR
BY Victor J. Evans
ATTORNEY
WITNESS John Donovan Patented Apr. 12, 1927.

1,624,768

UNITED STATES PATENT OFFICE.

BRYANT SIMPSON, OF WASHINGTON, DISTRICT OF COLUMBIA.

TAILOR'S MEASURE.

Application filed August 5, 1924. Serial No. 730,290.

This invention relates to a tailor's measure, by means of which the measurements necessary for the making or altering of a pair of trousers can be both quickly and accurately determined, the invention embodying certain improvements over Patent No. 1,465,875 issued to me August 21st, 1923.

One of the chief characteristics of the invention resides in the provision of an improved shoe encircling measure, susceptible of quick adjustment for determining the width of the trouser leg bottom and also the hollow or inclination of said bottom across the instep.

Another very important object resides in the provision of an adjustable and reversible measuring arm which can be quickly and conveniently used to obtain the proper measurement of the inseam of the trouser leg and subsequently used as a test measure for said seam when the trousers are laid flat upon a table or other suitable support.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:

Figure 1 is a view showing how the measure in its entirety is used for measuring the bottom of the trouser leg and also the inseam thereof.

Figure 2 is a view taken at a right angle to Figure 1.

Figure 3 is a plan view of the measure used in connection with the bottom of the trouser leg.

Figure 4 is a perspective view of said measure shown in Figure 3.

Figure 5 is a view showing how the measuring arm is reversed and used in the capacity of a test measure for the inseam of the trousers when the latter are laid flat upon a table or other support.

Figure 6 is a fragmentary view of the measuring arm above referred to.

Figure 7 is a sectional view through said arm taken on line 7—7 of Figure 5.

Figure 8 is a sectional view taken on line 8—8 of Figure 5.

Referring to the drawings in detail 10 represents a base or support, which is preferably in the nature of a stool commonly used by tailors. Supported on this stool is the device forming the subject matter of the present invention, which includes a frame 11 which is preferably of rectangular contour in plan. The frame is supported by a plurality of links 12 which are pivotally connected to the said frame and also to brackets 13 secured on top of the stool 10. As shown in Figure 4 the frame 11 terminates to provide closely associated parallel terminals 14 between which is pivoted one of the links 12, the remaining links supporting said frame being connected adjacent the opposite end thereof as shown. By reason of this pivotal connection between the base 10 and the frame 11, it is manifest that the latter can be moved toward and away from said base as the occasion may require. Carried by this frame is an arcuate shaped heel engaging member 15 which includes a shank 16 which is received between the adjacent parallel extremities 14, and secured to said extremities by the same fastening element utilized to secure the link 12 thereto. It will be noted however that the heel engaging member 15 is wholly disposed within the frame 11, as the heel of the person who is being measured is adapted to rest against this member when the person stands upon the base or stool 10 as shown in Figures 1 and 2. Measuring tape 17 is adjustably associated with the heel engaging member, being partly supported by this member for use in a manner to be hereinafter described. While the tape may be constructed from any suitable material, it is preferably formed of metal, but possesses sufficient flexibility to permit of the tape to be readily and easily adjusted to determine the desired width of the bottom of the trouser leg. Carried by the heel engaging member 15 are a series of spaced apertured lugs 18 arranged in pairs, and between each pair is journaled a small roller 19 behind which the tape 17 is passed. This allows the tape to be easily adjusted across the heel engaging member. The tape is also supported by a pair of curved plates indicated at 20 and 21 respectively which are normally arranged in the position shown in Figure 4, each plate being supported by a shank 22 projecting from a sleeve like member 23. One end of the tape is riveted or otherwise suitably secured to the plate 20, while the plate 21 is formed with a guide 24 to slidably receive the other end of the tape, which passes through the plate 20 which is of a cross sectional configuration for this purpose. Consequently when the said plates 20 and 21 are arranged in the positions shown in Figure 4, the tape possesses an elliptical formation to encircle the shoe of the person being measured. The tape can then be easily adjusted to determine the desired width of the trouser leg bottom. However in order to enlarge the size of the ellipse to facilitate the passing of the shoe therethrough, when the customer mounts the stool 10, I arrange the slides 23 upon the cross member 25 of a yoke which is mounted for both pivotal and sliding movement with relation to the frame 11. The parallel members 26 of the yoke are pivoted upon the slides 27 as shown in Figure 4, while the slides are mounted for movement longitudinally on the parallel sides of the frame 11. Depending from one of the parallel sides 26 of said yoke is a graduated gage 28 used to measure the hollow or inclination of the trouser leg bottom from the front to the rear of said leg as will be readily understood.

In practice, the person being measured stands upon the base or stool 10, passing one foot through the tape 17, which may be adjusted for this purpose by moving the slides 23 in a direction away from each other along the cross member 25 of the yoke. After the foot has been passed through the tape 17 the slides 23 are then brought to the position shown in Figure 4, and the tape adjusted by pulling on the free end thereof until the proper measurement of the bottom of the trouser leg is obtained, which measurement can be easily read by the graduations on the tape. The yoke is slidably mounted on the frame 11 so that any desired or proper measurement may be obtained. In addition to determining the width of the trouser leg at the bottom thereof the gage 28 may be used to measure or determine the desired or proper inclination of the bottom of said trousers across the instep or in other words from the front to the rear of the trouser leg as will be readily understood.

In addition to the device just described, the invention also makes use of a measuring arm for the purpose of measuring the inseam of the trousers while the person being measured occupies the position on the stool 10, and which arm can also be subsequently used as a test measure for said seam when the trousers are laid flat upon a table or other suitable support. The measuring arm is also equipped with a sliding gage for testing the measurements of the bottom of the trouser leg both as to width and inclination from the front to the rear thereof. The arm is preferably of T-formation including telescopic sections indicated at 29 and 30 respectively, the latter mentioned section being provided with the head or cross piece 31 which is suitably graduated as illustrated in Figure 5. The opposed ends of this cross member are offset as at 32, and these offset extremities support a rod 33 upon which is slidably mounted the graduated gage 34 which is used in connection with the graduations in the cross member 31 to determine the exact width of the bottom of the trouser leg as well as the inclination thereof, when the trousers are laid flat upon a table or other suitable support. In this respect the measuring arm is used in the capacity of a test measure. The respective sections 29 and 30 are graduated so that the length of the seam can be readily determined and the graduations are preferably arranged as shown in Figure 5, so that when the sections are adjusted, the highest number visible will indicate the length of the seam. The free end of the section 29 is provided with a clamp indicated generally at 35 so that this measuring arm in its entirety can be mounted on and clamped to the frame 11 when its use is desired as shown in Figures 1 and 2. It is to be also noted that the section 30 is graduated on both sides, while the section 29 is graduated on one side, inasmuch as the arm is adapted to be reversed for use in two different capacities. For instance when it is desired to determine the length of the inseam while the person being measured occupies the stool 10, the clamp 35 forming part of the measuring arm is secured to the inner side of the frame 11 by the thumb screw 36. The measuring arm is then arranged in the position shown in Figures 1 and 2, with the cross member or head 31 positioned within the crotch of the trousers. The graduations on one side of the section 30 of said arm are then read to determine the length of the inseam, the particular graduation lying at the upper end of the section 29 being indicative of the length of said seam. After the trousers have been made or altered, and it is desired to test the accuracy of the measurements, the trousers are laid flat on a table or other suitable support and for which purpose the measuring arm is used separately from the frame 11, and its position reversed as shown in Figure 5. In other words, when the measuring arm is used to test the accuracy of the measurements, the pants are laid flat on the table and the measuring arm arranged in the position shown in Figure 5, wherein it will be noted that the head or cross member 31 of said arm is arranged at the bottom of the trouser leg in contradistinction to the position it occupies in Figure 1, wherein it will be noted that it is arranged in the crotch of the trousers while the measurements are being taken. In addition to reversing the position of the measuring arm for this purpose, the arm is also turned over so that the graduations on the section 29 of said arm are used in connection with the graduations on the side opposite the section 30 from that shown in Figure 1. This is necessary, because when measuring the length of the seam from the crotch, when the arm is used in the manner shown in Figure 1, the measurement is taken from the upper or outer edge 37 of the cross member or head 31; while when the arm is arranged in its reversed position as shown in Figure 5 the measurement or length of the seam is read from the inner edge 38 of the cross member or head 31 of said arm. After the arm has been arranged on the trousers in the manner shown in Figure 1, the graduated gage 34 can be adjusted along the rod 33 and used in conjunction with the graduations on the said head 31 to determine the accuracy of the hollow or slope of the bottom of the trouser leg. The invention provides an accurate measure for fitting trousers around the shoe, and also affords a definite point to which the inseam is measured thereby making the inseam an accurate or true straight line as it should be.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim is:—

1. A tailor's measure comprising a support, a frame mounted thereon, a heel engaging member pivotally supported on said frame, a yoke pivotally and slidably mounted on said frame, a graduated tape of elliptical formation supported on the said heel engaging member and yoke and capable of being adjusted toward and away from said support, and also varying in length, and adapted to be used for measuring the width of the bottom of a trouser leg, and a gage pivotally mounted on said yoke and adjustable in a vertical plane to measure the angle or hollow of the bottom of said trouser leg.

2. A tailor's measure comprising a support, a shoe encircling member including a frame pivotally mounted on the support, a yoke pivotally and slidably mounted on said frame, a graduated tape of elliptical formation supported at one end by said frame, sleeve like members slidably supported on the cross members of said yoke and connected with the extremities of said tape whereby said members can be moved away from each other to facilitate the passing of the shoe through the tape and subsequently move toward each other to give the tape its elliptical formation, said tape being adjustable and used to measure the width of the bottom of a trouser leg, and means carried by said yoke for measuring the angle or hollow in the bottom of said trouser leg.

3. A tailor's measure comprising a measuring arm including telescopic sections, one of said sections having graduations on one side thereof for measuring the inseam of a trouser leg, a cross head carried by said section and adapted to be arranged in the crotch of the trousers for measuring said seam, and the measurement taken from the upper edge of said head, the other side of said section and the corresponding side of the other section being graduated for testing the length of said seam when the garment is made, said arm being adapted to be reversed to position the said head across the bottom of the trouser leg for this purpose, and a measurement taken from the inner edge of said head along said arm; said head being graduated on one side, and a vertically disposed gage slidably mounted on said head and cooperating therewith to test the width of the bottom of said trousers and independently used for testing the slant or hollow of the bottom of said trouser leg.

In testimony whereof I affix my signature.

BRYANT SIMPSON.